United States Patent [19]

Chung et al.

[11] Patent Number: 4,522,979

[45] Date of Patent: Jun. 11, 1985

[54] MOLDING COMPOSITIONS HAVING AN ENHANCED RESISTANCE TO GASOLINE

[75] Inventors: James Y. J. Chung, New Martinsville, W. Va.; James W. Rosthauser, Imperial, Pa.

[73] Assignee: Mobay Chemical Corporation, Pittsburgh, Pa.

[21] Appl. No.: 581,479

[22] Filed: Feb. 17, 1984

[51] Int. Cl.$^3$ .................. C08L 67/02; C08L 69/00
[52] U.S. Cl. ........................... 525/66; 525/67; 525/124; 525/439; 525/440; 525/467
[58] Field of Search ............... 525/66, 67, 440, 467, 525/124, 439

[56] References Cited

U.S. PATENT DOCUMENTS

| | | | |
|---|---|---|---|
| 3,563,849 | 2/1971 | Rye | 525/440 |
| 3,769,260 | 10/1973 | Segal et al. | 260/40 R |
| 3,856,749 | 12/1974 | Hoeschele | 525/440 |
| 3,864,428 | 2/1975 | Nakamura et al. | 260/873 |
| 4,034,016 | 5/1977 | Baron | 525/440 |
| 4,096,202 | 6/1978 | Farnham et al. | 260/873 |
| 4,119,607 | 10/1978 | Gergen | 525/440 |
| 4,165,307 | 8/1979 | Mizuno | 525/440 |
| 4,180,494 | 12/1979 | Fromuth et al. | 260/40 R |
| 4,222,926 | 9/1980 | Mizuno | 525/440 |
| 4,261,946 | 4/1981 | Goyert | 525/66 |
| 4,279,801 | 7/1981 | Kramer | 525/440 |
| 4,292,226 | 9/1981 | Wenzel et al. | 260/29.2 TN |
| 4,421,894 | 12/1983 | O Connor | 525/440 |

Primary Examiner—John C. Bleutge
Assistant Examiner—Patricia Short
Attorney, Agent, or Firm—Gene Harsh; Lawrence S. Pope; Aron Preis

[57] ABSTRACT

The present invention is directed to thermoplastic molding compositions which comprise a blend containing a thermoplastic polyester, a polycarbonate resin and an impact modifier and an amount of a blocked polyisocyanate prepolymer sufficient to improve the impact resistance and gasoline resistance of said blend.

8 Claims, No Drawings

MOLDING COMPOSITIONS HAVING AN ENHANCED RESISTANCE TO GASOLINE

FIELD OF THE INVENTION

The present invention relates to thermoplastic molding compositions and more particularly to compositions characterized by their resistance to gasoline.

SUMMARY OF THE INVENTION

The invention concerns thermoplastic molding compositions comprising an impact modified blend of polycarbonate and polyester resins rendered an increased level of gasoline resistance by the addition of a blocked (capped) polyurethane prepolymer thereto.

BACKGROUND OF THE INVENTION

The relevant prior art is noted to include U.S. Pat. No. 4,096,202 wherein disclosed are blends of polyalkylene terephthalate containing a crosslinked acrylic phase based multiphase composite characterized in its improved impact strength. U.S. Pat. No. 3,864,428 is noted to disclose impact improvement to an aromatic polyester molding composition containing a certain graft copolymer of a butadiene polymer vinyl monomer.

Core shell polymeric compounds having a butadiene-based core are taught in U.S. Pat. No. 4,180,494 to improve the impact performance of compositions comprising an aromatic polyester and an aromatic polycarbonate. Also of relevance is U.S. Pat. No. 3,769,260 wherein disclosed are thermoplastic molding compositions containing linear saturated polyesters and certain α-olefin polymer. Blocked (capped) polyurethanes of the type useful in the present context have been disclosed in U.S. Pat. No. 4,292,226.

DETAILED DESCRIPTION OF THE INVENTION

In the practice of the invention, thermoplastic molding compositions are prepared comprising a blend of a thermoplastic polyester resin, a thermoplastic aromatic polycarbonate resin and an impact modifier and further comprising an additive amount of at least one blocked (capped) polyurethane prepolymer. The blend containing the indicated resins, i.e. thermoplastic polyester, thermoplastic polycarbonate and impact modifier, is characterized in that the relative amounts of these constituents are about 10 to about 80 percent of thermoplastic polyester, about 15 to 85 percent of polycarbonate and about 5 to about 30 percent of the impact modifier, the percents are in relation to the weight of the blend. The compositions of the invention are characterized in that they contain an additive amount, preferably about 0.1 to about 6.0 percent, relative to the weight of the blend, of a blocked (capped) polyurethane prepolymer, said amount being sufficient to impart to said blend an improved level of impact strength and of gasoline resistance.

The thermoplastic resin composition of this invention may be prepared by uniformly mixing the components, using any desired means such as a Banbury mixer, a hot roll or an extruder. The mixture is extruded and pelletized in a known manner, and is suitable for injection molding into a variety of useful articles. The composition may contain additives such as are well known in the art including stabilizers, mold release agents, crystallization promoters, dyes and pigments, flame retardants as well as reinforcing agents, including fillers and glass fibers.

The polyester resins of the compositions in accordance with the invention are characterized in that their intrinsic viscosity (I.V.) is at least about 0.4 and preferably about 0.6 to about 16 dl/gm measured as a 1% solution in a 60:40 mixture of phenol and tetrachloroethane at 30° C. These resins are available commercially or can be prepared by known means such as by the alcoholysis of esters of terephthalic acid with ethylene glycol followed by polymerization, by heating the glycols with the free acids or with their halide derivative and similar processes such as are described among others in U.S. Pat. Nos. 2,465,319 and 3,047,539, both incorporated herein by reference.

The preferred thermoplastic polyester in the present context is polyethylene terephthalate, PET, such as is available under the designation VFR 5041 from Goodyear Corporation.

The dicarboxylic acid component of polyethylene terephthalate consists mainly of terephthalic acid and may contain up to 10 mol %, based on the total mols of acid of other aromatic dicarboxylic acids having from 6 to 14 carbon atoms, of aliphatic dicarboxylic acids having from 4 to 8 carbon atoms or of cycloaliphatic dicarboxylic acids having from 8 to 12 carbon atoms. Examples of such dicarboxylic acids which may be included with terephthalic acid are phthalic acid, isophthalic acid, naphthalene-2,6-dicarboxylic acid, diphenyl-4,4'-dicarboxylic acid, adipic acid, sebacic acid and cyclohexanediacetic acid.

The diol component of the polyethylene terephthalate consists mainly of ethylene glycol. It may, however, contain up to 10 mol % of aliphatic diols having from 3 to 12 carbon atoms, cycloaliphatic diols having from 6 to 15 carbon atoms or aromatic diols having from 6 to 21 carbon atoms. Examples of such additional diols ("codiols") include propane-1,3-diol, butane-1,4-diol, pentane-1,5-diol, hexane-1,6-diol or cyclohexane-1,4-dimethanol, 3-methyl-pentanediol-(2,4), 2-methylpentanediol-(1,4), 2,2,4-trimethylpentanediol(1,3), 2-ethylhexanediol-(1,3), 2,2-diethyl propanediol-(1,3), hexanediol-(1,3), 14-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(3-β-hydroxyethoxyphenyl)-propane and 2,2-bis-(4-hydroxypropoxyphenyl)-propane.

The polyethylene terephthalates can be branched by incorporating relatively small amounts of trihydric or tetrahydric alcohols or tribasic or tetrabasic acids, as described in German Offenlegungsschrift No. 1,900,270 and in U.S. Pat. No. 3,692,744. Examples of suitable branching agents include trimellitic acid, trimesic acid, pyromellitic acid, trimethylolpropane and ethane, and pentaery-thritol. It is advisable not to use more than 1 mol % of branching agent, based on the quantity of acid component.

Polyethylene terephthalates derived mainly from terephthalic acid and ethylene glycol are preferred and homopolyethylene terephthalate, i.e. a product produced substantially only from ethylene glycol and terephthalate acid or its esters, or its anhydride is most preferred.

POLYCARBONATE RESINS

In the present context, polycarbonate resins may have a molecular weight (weight average) of about 10,000 to about 200,000, preferably about 20,000 to about 80,000, and may have a melt flow rate, per ASTM D-128 at 300° C., of about 1 to about 24 gm/10 minutes, preferably about 2-6 gm/10 minutes.

In the present context, dihydroxy compounds suitable for the preparation of the polycarbonates of the invention conform to the structural formulae (1) or

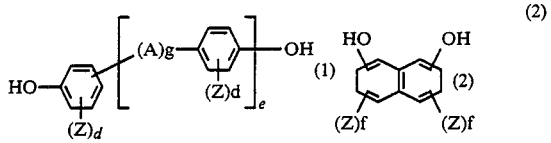

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, an —SO— or —SO$_2$— radical; a radical of the general formula

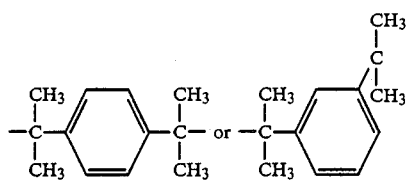

g denotes the number 0 or 1;
e denotes the number 0 or 1;
Z denotes F, Cl or Br atoms or a C$_1$–C$_3$ alkyl and if several Z radicals are substituents in one aryl radical, they may be identical or different;
d denotes 0 or an integer of from 1 to 4; and
f denotes 0 or an integer of from 1 to 3.

Among the useful bisphenols in the practice of the invention are hydroquinone, resorcinol, bis-(hydroxyphenyl)-alkanes, bis-(hydroxyphenyl)cycloalkanes, bis-(hydroxyphenyl)-ethers, bis-(hydroxyphenyl)-ketones, bis-(hydroxyphenyl)sulfoxides, bis-(hydroxyphenyl)-sulfones and α,α-bis-(hydroxyphenyl)-diisopropylbenzenes. These and further suitable aromatic dihydroxy compounds are described, for example, in U.S. Pat. Nos. 3,035,021; 3,035,036; 3,036,037; 3,036,038; 3,036,039; 3,028,365; 2,999,835; 3,148,172; 3,271,368; 2,991,273; 3,271,367; 3,280,078; 3,014,891 and 2,999,846 (all incorporated herein by reference), in German Offenlegungsschriften (German Published Specifications) Nos. 1,570,703; 2,063,050; 2,063,052; 2,211,956 and 2,211,957, in French Patent Specification No. 1,561,518 and in the monograph, H. Schnell, Chemistry and Physics of Polycarbonates, Interscience Publishers, New York, 1964. Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-chloro-4-hydroxyphenyl)-propane, hydroxybenzophenone and 4,4'-sulfonyl diphenol.

The most preferred bisphenol is 2,2-bis-(4-hydroxyphenyl)-propane (bisphenol A).

The polycarbonates of the invention may entail in their structure units derived from one or more of the suitable bisphenols.

The preparation of polycarbonate resins may be carried out in accordance with any of the processes known in the art, for example by the interfacial polycondensation process, polycondensation in a homogeneous phase or by transesterification. The suitable processes and conditions have been disclosed in the literature and in general are described in the above-mentioned monograph by H. Schnell.

In the preparation of the polycarbonate resins of the invention, monofunctional reactants such as monophenols may be used in order to limit their respective molecular weights. Also, branching obtained by the incorporation, in the respective processes, of small amounts, preferably of between about 0.05 and 2.0 mol % (relative to diphenols employed) of branching agents which are trifunctional or more than trifunctional compounds, especially, compounds having three or more phenolic hydroxyl groups.

Polycarbonates of this type are described, for example, in German Offenlegungsschriften (German Published Specifications) Nos. 1,570,533; 1,595,762; 2,116,974 and 2,113,347, British Specification 1,079,821 and U.S. Pat. No. 3,544,514 (incorporated herein by reference).

Some examples of compounds with three or more than three phenolic hydroxyl groups which can be used are phloroglucinol, 4,6-dimethyl-2,4,6-tri-(4-hydroxyphenyl)-heptane, 2,4,6-tri-methyl-2,4,6-tri-(4-hydroxyphenyl)-heptane, 1,4,5-tri-(4-hydroxyphenyl)benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenyl-isopropyl)-phenol, 2,6-bis-(2-hydroxy-5'-methylbenzyl)-4-methylphenol, 2-(4-hydroxyphenyl)-2-(2,4-dihydroxyphenyl)-propane, hexa(4-(4-hydroxyphenylhexa(4-(4-hydroxyphenylisopropyl)-phenyl)ortho-terephthalic acid ester, tetra-(4-hydroxyphenyl)methane, tetra-(4-(4-hydroxyphenylisopropyl)phenoxy)-methane and 1,4-bis-((4',4''-dihydroxytriphenyl)-methyl)benzene. Some of the other trifunctional compounds are 2,4-dihydroxy-benzoic acid, trimellitic acid, trimesic acid, cyanuric chloride and 3,3-bis-(4-hydroxyphenyl)-2-oxo-2,3-dihydroindole.

Impact Modifier

In the context of the invention, impact modifiers are rubbery compounds characterized in their rubber elastic properties and in that their glass transition temperature is below 20° C. preferably below 0° C. and further in their compatibility with the thermoplastic polyester wherein they are incorporated; a compatible impact modifier in the present context is one capable of forming a substantially uniform dispersion in the matrix wherein it is incorporated. The term rubbery compounds in the present context is understood to include natural rubbers and synthetic rubbers. Suitable synthetic rubbers include polyurethane rubber, ethylene/-vinyl acetate rubber, silicone rubber and polyether rubber, acrylate rubber, polypentenamer rubber and ethylene-propylene-diene rubbers as well as diene rubbers, i.e. homopolymers of conjugated dienes having 4 to 8 carbon atoms such as butadiene, isoprene, piperylene and chloroprene, copolymers of such dienes including copolymers of such dienes with styrene, acrylic or methacrylic acids or derivatives thereof (e.g. acrylonitrile, methacrylonitrile, acrylic acid, methacrylic acid, butyl acrylate and methyl methacrylate) or isobutylene. Butadiene, butadiene/styrene, butadiene/methyl methacrylate, butadiene/butyl acrylate, ethylene/propylene/diene, polypentenamer, butadiene/acrylonitrile and acrylate rubbers are particularly preferred. In a particularly preferred embodiment, the rubber phase is at least partially crosslinked.

The rubbery compounds of the invention are preferably graft copolymers obtained by polymerizing in the presence of the rubber a "shell" purposed primarily at improving the compatibility of the modifier with the matrix wherein it is incorporated. Among useful monomers for that purpose are:

(1) styrene an its derivatives such as α-methylstyrene, α-chlorostyrene, p-chlorostyrene, 2,4-dichlorostyrene, p-methylstyrene, 3,4-dimethylstyrene, o- and p-divinyl benzene, p-methyl-α-methylstyrene and p-chloro-α-methylstyrene;

(2) acrylic and methacrylic acids as well as nitriles and esters based thereon preferably alkyl esters such as acrylic and methacrylic acid, acrylonitrile, methacrylonitrile, methyl acrylate, ethyl acrylate, n-propyl and isopropyl acrylate, n-butyl and isobutyl acrylate, 2-ethylhexyl acrylate, methyl methacrylate, ethyl methacrylate, n-propyl and isopropyl methacrylate, n-butyl and isobutyl methacrylate, cyclohexyl methacrylate and isobornyl methacrylate;

(3) maleic acid anhydride. The graft copolymers may be obtained by polymerizing monomers from group (1) or group (2) or both groups (1) and (2) in the presence of the rubbers as mentioned above, optionally also with (3).

Particularly preferred groups of such graft polymers are obtained by polymerizing (a) styrene, α-methyl styrene or mixtures thereof, (b) 0–50% by weight (based on total monomers) of the other above-mentioned styrene derivatives in the presence of butadiene, butadiene/styrene, butadiene/methyl methacrylate, butadiene/butyl acrylate, ethylene/propylene/diene, polypentenamer or butadiene/acrylonitrile rubbers (which may also contain in copolymerized form small amounts of other monomers). Other particularly preferred graft polymers are obtained by polymerizing 30–95% by weight of styrene and/or one of the above-mentioned styrene derivatives and 5–70% by weight of the above-mentioned acrylic and/or methacrylic compounds, (% by weight based on the sum of monomers) in the presence of the above-mentioned rubbers.

Among the particularly preferred graft polymers, those which are obtained by polymerizing styrene or by polymerizing 20–95 percent by weight of styrene and 5–80 percent by weight of α-methyl styrene (percent by weight based on the sum of monomers) or 30–95 percent by weight of styrene and/or α-methyl styrene and 5–70 percent by weight of acrylonitrile and/or methacrylonitrile and/or methyl methacrylate (percent by weight based on the sum of monomers) in the presence of the above-mentioned rubbers are particularly important.

A yet additional preferred embodiment is represented by the use of a grafted polyacrylate rubber which can be made following known procedures and which is available from a number of sources, e.g. Rohm & Haas Company, Philadelphia, U.S.A. under the trade designations Acryloid KM330 and 7709XP. Other useful polyacrylates are available from Goodyear Tire & Rubber Company, Akron, Ohio, U.S.A., under the trade designation RXL6886; from American Cyanamide Company, Stamford, Conn., U.S.A., under the trade designation Cyanacryl 770; from M & T Chemicals Company, Trenton, N.J., U.S.A., under the trade designation Durastrength 200; and from Polysar Corporation, Canada, under the trade designation Polysar S1006. In general, any of the polyalkyl acrylates described in U.S. Pat. No. 3,591,659, incorporated by reference herein, can be used, especially those containing units derived from n-butyl acrylate. Preferably, the polyacrylate resin will be in the form of a rubber-elastic graft copolymer having a glass transition temperature below 20° C. as described in Schlichting et al, U.S. Pat. No. 4,022,748, incorporated by reference herein. Especially preferably, the polyacrylate will comprise a multiple stage polymer having a rubber first stage and a thermoplastic hard final stage, as described in U.S. Pat. Nos. 4,096,202 and 3,808,180, both incorporated herein by reference. Briefly, the technology described in U.S. Pat. No. 4,096,202 is that of the preparation of a specific class of multiphase compounds. These are compositions comprising about 25 to 95 percent by weight of a first elastomeric phase and about 75 to 5 percent by weight of a second, rigid, thermoplastic phase. The first phase is polymerized from about 75 to 99.8 percent by weight $C_1$ to $C_6$ acrylate resulting in an acrylic rubber core having a glass transition temperature below about 10° C. which is crosslinked with 0.1 to 5 percent by weight of a crosslinking monomer and to which is added 0.1 to 5 percent by weight of a graftlinking monomer.

The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include polyacrylic and polymethacrylic esters of polyols such as butylene diacrylate and dimethacrylate, trimethylol propane trimethacrylate and the like; di- and trivinyl benzene, vinyl acrylate and methacrylate, and the like. The preferred crosslinking monomer is butylene diacrylate. The graftlinking monomer is a polyethylenically unsaturated monomer having a plurality of addition polymerizable reactive groups, at least one of which polymerizing at a substantially different rate of polymerization from at least one other of said reactive groups. The function of the graftlinking monomer is to provide a residual level of unsaturation in the elastomeric phase, particularly in the latter stages of polymerization and consequently at or near the surface of the elastomer particles. The preferred graftlinking monomer is allyl methacrylate or diallyl maleate.

The final stage monomer system can be comprised of alkyl methacrylate, preferably $C_1$–$C_{16}$ methacrylate, styrene, acrylonitrile, alkyl acrylates, dialkyl methacrylate, and the like, as long as its Tg is at least 20° C. Preferably, the final stage monomer system is at least 50 weight percent $C_1$–$C_4$ alkyl methacrylate. It is further preferred that the final stage polymer be free of units which tend to degrade poly(alkylene terephthalate); for example, acid, hydroxyl amino and amide groups.

A certain such acrylic rubber interpolymer composite characterized in that acrylic rubber core is comprised of n-butyl acrylate and in that its crosslinking agent is 1,3-butylene dicrylate and in which the graftlinking agent is diallyl maleate and the second phase monomeric system of which is methyl methacrylate, said components relating by weight to 79.2/0.4/0.4/20.0, is available in commerce as Acryloid KM330.

Blocked (Capped) Polyisocyanate Prepolymers

In the present invention the polyisocyanate prepolymer suitable, in its end capped configuration, as a synergist in the present invention is generally described in U.S. Pat. No. 4,292,226, incorporated herein by reference. Further in the present context the term prepolymer includes adducts within its scope.

Accordingly, suitable starting materials for producing the NCO-prepolymers are:

(1) Any organic polyisocyanates, preferably diisocyanates corresponding to the formula $$Q(NCO)_n$$

in which n=2 to 4, preferably 2, and

Q represents a saturated aliphatic hydrocarbon radical containing from 2 to 18, preferably from 6 to 10 carbon atoms, or a saturated cycloaliphatic hydrocarbon radical containing from 4 to 15, preferably from 6 to 13 carbon atoms or an aromatic hydrocarbon radical containing from 6 to 15, preferably from 6 to 13 carbon atoms or an arylaliphatic hydrocarbon radical containing from 8 to 15, preferably from 8 to 13 carbon atoms, at least 2 carbon atoms being arranged between the NCO-groups in each case.

Examples of suitable polyisocyanates, particularly diisocyanates, are tetramethylene diisocyanate, hexamethylene diisocyanate, dodecamethylene, diisocyanate, cyclobutane-1,3-diisocyanate, cyclohexane-1,3- and -1,4-diisocyanate and mixtures of these isomers, 1-isocyanato-3,3,5-trimethyl-5-isocyanatomethyl cyclohexane (IPDI), 2,4- and 2,6-hexahydrotoluene diisocyanate and mixtures of these isomers, hexahydro-1,3- and/or 1,4-phenylene diisocyanate, perhydro-1,4'- and/or -4,4'-diphenyl methane diisocyanate 1,3- and 1,4-phenylene diisocyanate, 2,4- and 2,6-toluene diisocyanate and mixtures of these isomers, diphenyl methane-2,4'- and/or -4,4'-diisocyanate and naphthylene-15-diisocyanate. Also suitable are dicyclohexyl methane-4,4'-diisocyanate, 1,3- and 1,4-bis(isocyanatomethyl)cyclohexane, and 1,3- and 1,4-bis(2-isocyanato-2-propyl)benzene.

It is of course also possible to use mixtures of these isocyanates. Small quantities of mono- and triisocyanates may also be used. It is of course also possible to use the modified polyisocyanates known per se in polyurethane chemistry, i.e. polyisocyanates containing for example carbodiimde groups, allophanate groups, isocyanurate groups, urethane groups and/or biuret group, in the process according to the invention.

Preferred polyisocyanates are hexamethylene diisocyanate, 1-isocyanate-3,3,5-trimethyl-5-isocyanatomethyl cyclohexane, diphenyl methane-4,4'-diisocyanate, dicyclohexyl methane-4,4'-diisocyanate, 2,4- and 2,6-tolylene diisocyanate and mixtures thereof.

(2) Any organic compounds containing at least two isocyanate-reactive groups, more particularly organic compounds containing a total of two amino groups, thiol groups, carboxyl groups and/or hydroxyl groups and having molecular weights in the range from about 61 to 10,000 and preferably in the range from about 300 to 4000. The corresponding dihydroxyl compounds are preferably used. The use of compounds with a functionality of three or higher in the isocyanate polyaddition reaction in small quantities in order to obtain a certain degree of branching is also possible, as is the above-mentioned possible use of trifunctional or more highly functional polyisocyanates for the same purpose.

Preferred hydroxyl compounds are the hydroxyl polyesters, hydroxy polyethers, hydroxy polythioethers, hydroxy polyacetals, hydroxy polyolefin, hydroxy polybutadiene, hydroxy polycarbonates and/or hydroxy polyester amides known per se in polyurethane chemistry. Suitable polyesters containing hydroxyl groups are, for example, reaction products of polyhydric, preferably dihydric and, optionally, trihydric alcohols with polybasic, preferably dibasic, carboxylic acids. Instead of using a free polycarboxylic acid, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may be substituted, for example by halogen atom, and/or unsaturated. Examples of polycarboxylic acids such as these are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, glutaric acid anhydride, maleic acid, maleic acid anhydride, fumaric acid, dimeric and trimeric fatty acids, such as oleic acid, which may be used in admixture with monomeric fatty acids, terephthalic acid dimethylester, terephthalic acid-bis-glycol ester. Suitable polyhydric alcohols are for example ethylene glycol, 1,2- and 1,3-propylene glycol, 1,4- and 1,3-butylene glycol, 1,6-hexane diol, 1,8-octane diol, neopentyl glycol, 1,4-bis(hydroxymethyl)cyclohexane, 2-methyl-1,3-propane diol, glycerol, trimethylol propane, 1,2,6-hexane triol, 1,2,4-butane triol, trimethylol ethane, pentaerythritol, quinitol, mannitol and sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. Polyesters of lactones, for example ε-caprolactone, or hydroxy carboxylic acids, for example ω-hydroxy caproic acid, may also be used.

The polyethers suitable for use in accordance with the invention, preferably containing two hydroxyl groups are also known per se and are obtained for example by polymerizing epoxides, such as ethylene oxide, propylene oxide, butylene oxide, tetrahydrofuran, styrene oxide or epichlorohydrin, on their own, for example in the presence of boron trifluoride, or by the addition of these epoxides, either in admixture or successively, with starting components containing reactive hydrogen atoms, such as alcohols and amines, for example water, ethylene glycol, 1,3- or 1,2-propylene glycol, 4,4'-dihydroxy diphenyl propane or aniline.

Polyethers modified by vinyl polymers of the type formed for example by polymerizing styrene, acrylonitrile in the presence of polyethers as described in U.S. Pat. Nos. 3,383,351; 3,304,273; 3,523,093; and 3,110,695, all incorporated herein by reference and German Pat. No. 1,151,536 are also suitable. The more highly functional polyethers which may also be proportionately used are similarly obtained in known manner by alkoxylating starter molecules of relatively high functionality, for example, ammonia, ethanolamine, ethylene diamine or sucrose.

Among the polythioethers, particular reference is made to the condensation products of the thiodiglycol on its own and/or with other glycols, dicarboxylic acids, formaldehyde, aminocarboxylic acids or aminoalcohols. Depending on the co-components, the products in question are polythio mixed ethers, polythio ether esters, polythio ether ester amides.

Suitable polyacetals are, for example, the compounds obtainable from glycols, such as diethylene glycol, triethylene glycol, 4,4'-diethoxy diphenyl dimethyl methane, hexane diol and formaldehyde. Polyacetals suitable for use in accordance with the invention may also be obtained by polymerizing cyclic acetals.

Suitable polycarbonates containing hydroxyl groups are known per se and may be obtained for example by reacting diols, such as 1,3-propane diol, 1,4-butane diol and/or 1,6-hexane diol, diethylene glycol, triethylene glycol, tetraethylene glycol, with diaryl carbonates, for example diphenyl carbonate, or phosgene.

The polyester amides and polyamides include for example the predominantly linear condensates obtained from polybasic saturated and unsaturated carboxylic acids or their anhydrides and polyhydric saturated and unsaturated amino alcohols, diamines, polyamines and their mixtures. Polyhydroxyl compounds already containing urethane or urea groups may also be used.

It is also possible to use low molecular weight polyols such as, for example, ethylene glycol, 1,2- and 1,3-propane diol, 1,4- and 1,3-butane diol, pentane diols, hexane diols, trimethylol propane, hexane triols, glycerol and pentaerythritol. Monofunctional alcohols, such as stearyl alcohol for example, may also be used in small quantities.

Representatives of the above-mentioned polyisocyanate and hydroxyl compounds suitable for use in the process according to the invention are described, for example, in High Polymers, Vol. XVI, "Polyurethanes, Chemistry and Technology" by Saunders-Frisch, Interscience Publishers, N.Y., London, Vol. I, 1962, pages 32-42 and pages 44-54, and Vol. II, 1964, pages 5-6 and 198-199, and also in Kunststoff-Handbuch, Vol. VII, Vieweg-Höchtlen, Carl-Hanser-Verlag, Munich, 1966, for example on pages 45-71.

Further, U.S. Pat. No. 3,756,992 and U.S. Pat. No. 3,479,310 both incorporated herein by reference provide added information respecting the preparation of suitable polyurethane prepolymers which upon capping are useful in the present context.

Capped or blocked isocyanates are described, for instance in "Polyurethanes, Chemistry and Technology", by Saunders-Frisch, 1962, incorporated by reference herein—see especially pages 118-121 and in New Developments in the Field of Blocked Isocyanates II by Zeno W. Wicks, Jr., Polymers and Coatings Department, North Dakota State University, Fargo, N. Dak., Prog. Org. Coat., 1981 9(1) 3-28, and Blocked Isocyanates by Zeno W. Wicks, Jr., Prog. Org. Coat. 3(1975), 73-99, incorporated herein by reference.

Blocking agents suitable for use in the process according to the invention are, in particular, compounds with preferably one isocyanate-reactive group which enter into an addition reaction with organic isocyanates at temperatures above about 50° C. and preferably at temperatures in the range of from about 60° to 100° C., and whose resulting addition products, in admixture with involatile polyols containing primary hydroxyl groups, react with the involatile polyols to form urethanes at temperatures in the range of from about 100° to 200° C., the reaction being accompanied by liberation of the blocking agent. Suitable blocking agents of this type are, for example, secondary or tertiary alcohols, such as isopropanol or tert.-butanol, C-H-acid compounds, such as malonic acid dialkyl esters, acetyl acetone, acetoacetic acid alkyl esters, oximes, such as formaldoxime, acetaldoxime, methyl ethyl ketone oxime, cyclohexanone oxime, acetophenone oxime, benzophenone oxime or diethyl glyoxime, lactams, such as ε-caprolactam, δ-valerolactam, γ-butyrolactam, phenols, such as phenol, o-methyl phenol, N-alkyl amides, such as N-methyl acetamide or acetanilide, imides, such as phthalimide, imidazole, alkali metal bisulphites or trialkyl ammonium bisulphites.

The preferred blocking (or capping) agents include cyclic 1,3-diketone, for example 1,3-cyclohexanedione, hydroxamic acid ester, benzotriazole, imidazole, oxime, for example 2-butanone oxime, alcohol, phenol, hydroxy substituted nitrogen compounds such as n-hydroxy phthalimide.

A particularly preferred blocked (capped) prepolymer is an ε-caprolactam capped TDI-polyurethane prepolymer.

The following examples are presented by way of an illustration of the invention and in no way are they to be taken as a limitation thereof.

EXAMPLES

EXAMPLE 1

The preparation of a blocked polyurethane prepolymer suitable in the present context was carried out as follows:

A 5 liter, three neck, round bottomed flask equipped with a thermometer, mechanical stirrer and drying tube was charged with 2012.0 grams Polymeg 2000 (2000 avg. MW polytetramethylene glycol; The Quaker Oats Company). To this was added 527.9 grams Demodur W (dicyclohexylmethane-4,4'-diisocyanate; Mobay Chemical Corporation). The mixture was stirred and slowly heated to 110° C. Stirring was maintained at this temperature for two hours. The mixture was cooled to 25° C. then 227.4 grams ε-caprolactam and 2.4 grams of sodium methoxide solution (25% pbw in methanol) were added. The mixture was stirred and heated to 110° C. Stirring was maintained at this temperature for four hours at which time an infrared spectrum indicated the absence of unreacted isocyanate. The material was a highly viscous liquid at room temperature and is characterized in that its percent blocked NCO is about 2.9 and further in that its NCO equivalent weight is about 1400 (both values calculated based on charge).

EXAMPLE 2

The preparation of an ε-caprolactam capped TDI-polyurethane prepolymer suitable in the present context was carried out as follows:

The polyol components (302 parts by weight of polyol A which is a 2000 MW difunctional polypropylamine oxide, 157 parts by weight of polyol B which is a 3000 MW—glycerin initiated trifunctional polypropylene oxide and 232.2 parts by weight of a 4800 MW polyol C which is a glycerin initiated polyether containing both propylene oxide and ethylene oxide and 1.66 parts by weight of trimethylol propane and 106.6 parts of TDI (a mixture of 80% of 2,4-isomer and 20% of the 2,6-isomer) were mixed and heated with continued stirring to 70°-85° C. The mixture was allowed to react with the NCO content was just below the theretical level (3.0%) which reaction took about 7 hours. 81.4 parts of weight of ε-caprolactam were then changed and the mixture was heated with stirring to 80°–85° C. and allowed to react until no free isocyanate was detected by infrared spectroscopy which reaction time was about 8 hours.

The product was characterized in that its blocked NCO content was 2.6% and its viscosity, at 25° C. was 55,000 mPa-s.

EXAMPLE 3

The table below summarizes the properties of a composition prepared in accordance with the invention and sets these in comparison to a prior art composition. In preparing the compositions, the components were dried at 100° C. overnight in a vacuum oven. The prepolymer was held at 100° C. for 30 minutes prior to its introduction into the blend. The components were then tumble blended and then further mixed (Welex at high speed for 30 minutes) before extrusion. The extrusion was carried out using a 2 in. MPM vented extruder, zone set temperature (°C.), rear to front 260/260/260/260/260/clamp 225/Die 255; screw speed 80 rpm; screen pack 20-40-60-20; vacuum 18 mm Hg.

Injection molding was carried out using a 4 oz. Newbury; zone set temperature (°C.), rear 260, front 260, nozzle 254, mold 90; cycle time (seconds), injection 12, cooling 25, total 37; injection pressure (psi), initial 800, secondary 750.

In preparing the compositions described below the following materials were used:

PET—Goodyear's Vituf 1001A, a polyethylene terephthalate resin having an intrinsic viscosity of about 1.04/dl/gm.

Polycarbonate—A bisphenol A derived homopolycarbonate characterized in that its melt index per ASTM D-1238 is about 3.0–5.9 gm/10 min. available from Mobay Chemical Corporation;

ABS—characterized in that its polybutadiene content is about 75%; in that it is grafted with 25% SAN (S/AN=72/28 by weight) and in that its Tg is about −86° C. available from Bayer AG.

The blocked polyisocyanate was prepared as described in Example 1.

The composition further contained 0.1 phr talc, 0.1 phr of an antioxidant (tris-[(3-ethyl-oxetanyl-3)-methyl]-phosphite) and 0.15 phr carbon black, all of which components are of no criticality in the present context.

|  | Composition A | B Control |
|---|---|---|
| PET, % | 54.0 | 54.0 |
| Polycarbonate, % | 36.0 | 36.0 |
| ABS, % | 10.0 | 10.0 |
| Blocked polyisocyanate, phr | 2.0 | — |
| Properties |  |  |
| Impact strength, Notched Izod (ft. lb./in.) ⅛" at 23° C. | 23.0 | 19.0 |
| Flexural strength, psi × 10$^{-3}$ | 11.4 | 11.4 |
| Flexural modulus, psi × 10$^{-5}$ | 3.11 | 3.11 |
| Tensile strength, psi × 10$^{-3}$ | 7.37 | 7.29 |
| Elongation, % | 182 | 151 |
| Heat distortion temperature, °C. |  |  |
| at 66 psi | 102 | 117 |
| at 264 psi | 81 | 86 |

The compositions, above, were further compared in terms of their respective resistance to gasoline. Gasoline resistance was determined by measuring the tensile elongation of a tensile bar which was stored for 3 days in air after the following gasoline treatment: 3 cycles of immersion in gasoline in 5 minutes and drying for 15 minutes under a given strain, E max.

|  |  | Elongation, % | |
|---|---|---|---|
|  |  | Composition A | Composition B (control) |
| Control |  | 180 | 160 |
| E max | 0 | 190 | 155 |
|  | 0.63 | 190 | 70 |
|  | 0.95 | 45 | 20 |
|  | 1.26 | 155 | 25 |
|  | 1.57 | 115 | 115 |
|  | 1.89 | 185 | 140 |
|  | 2.20 | 175 | 75 |
|  | 2.50 | 170 | 135 |

It is to be understood that changes may be made in the particular embodiment presented above, which changes are within the intended scope of the invention.

What is claimed is:

1. A thermoplastic molding composition comprising
   (a) a blend containing
      (i) about 10 to about 80% of a thermoplastic polyester having an intrinsic viscosity of at least about 0.4 dl/gm measured as a 1% solution in a 60:40 mixture of phenol and tetrachloroethane at 30° C.,
      (ii) about 15 to about 85% of a thermoplastic aromatic polycarbonate resin having a weight average molecular weight of about 10,000 to about 200,000,
      (iii) about 5 to about 30% of a substantially uniformly dispersed impact modifier which is a rubbery compound selected from the group consisting of natural rubbers and synthetic rubbers, having a glass transition temperature below 20° C., and
   (b) a blocked polyisocyanate prepolymer in sufficient amount to impart to said blend improved impact strength and gasoline resistance,
said percents being in relation to the weight of said blend.

2. The molding composition of claim 1 wherein said (i) is polyethylene terephthalate.

3. The molding composition of claim 1 wherein said (iii) is a graft polymer of a member selected from the group consisting of polyurethane rubber, ethylene-vinyl acetate rubber, silicone rubber, polyether rubber, acrylate rubber, polypentanamer rubber, ethylenepropylene-diene rubber and diene rubbers.

4. The composition of claim 2 wherein said (iii) is a graft polymer of polybutadiene.

5. The composition of claim 4 wherein said prepolymer is ε-caprolactam blocked.

6. A thermoplastic molding composition comprising a blend containing
   (i) about 10 to about 80% of polyethylene terephthalate resin having an intrinsic viscosity of about 0.6 to about 1.6 dl/gm measured as a 1% solution in a 60:40 mixture of phenol and tetrachloroethane at 30° C.,
   (ii) about 15 to about 85% of an aromatic thermoplastic polycarbonate resin having a weight average molecular weight of about 20,000 to about 80,000, (iii) about 5 to about 30% of a substantially uniformly dispersed impact modifier which is a graft polymer rubber compound having a glass transition temperature below 20° C., (iv) about 0.1 to about 6.0% of a blocked polyisocyanate prepolymer, said percents being in relation to the weight of said blend.

7. The composition of claim 6 wherein said prepolymer is ε-caprolactam capped TDI-polyurethane prepolymer.

8. A thermoplastic molding composition comprising a blend containing (i) about 10 to about 80% of polyethylene terephthalate resin having an intrinsic viscosity of about 0.6 to about 1.6 dl/gm measured as a 1% solution in a 60:40 mixture of phenol and tetrachloroethane at 30° C., (ii) about 15 to about 85% of an aromatic thermoplastic polycarbonate resin having a weight average molecular weight of about 20,000 to about 80,000, (iii) about 5 to about 30% of a substantially uniformly dispersed acrylonitrile-butadiene-styrene, (iv) about 0.1 to about 6.0% of a blocked polyisocyanate prepolymer, said percents being in relation to the weight of said blend.

* * * * *